United States Patent [19]

Broer et al.

[11] Patent Number: 4,733,941
[45] Date of Patent: Mar. 29, 1988

[54] OPTICAL FIBRE COMPRISING A SYNTHETIC RESIN CLADDING AND METHOD OF AND DEVICE FOR MANUFACTURING SUCH AN OPTICAL FIBRE

[75] Inventors: Dirk J. Broer; Grietje N. Mol; Cornelis M. G. Jochem, all of Eindhoven, Netherlands

[73] Assignee: U.S. Philips Corporation, New York, N.Y.

[21] Appl. No.: 903,008

[22] Filed: Sep. 2, 1986

[30] Foreign Application Priority Data

Sep. 3, 1985 [NL] Netherlands ............... 8502402

[51] Int. Cl.⁴ .............................. B05D 3/06
[52] U.S. Cl. ........................ 350/96.33; 350/96.29
[58] Field of Search .......... 427/44, 54.1; 118/405; 350/96.23, 96.29, 96.33

[56] References Cited

U.S. PATENT DOCUMENTS 3,960,530 6/1976 Iyengar ..................... 118/405
4,474,830 10/1984 Taylor ....................... 427/54.1
4,482,204 11/1984 Blyler et al. ................. 427/54.1
4,502,222 3/1985 Holt et al. ................... 118/405

Primary Examiner—John H. Newsome
Attorney, Agent, or Firm—Norman N. Spain

[57] ABSTRACT

The invention provides an optical fibre having a synthetic resin cladding, comprising a glass fibre, a first cladding layer of a synthetic rubber and a subsequent cladding layer of a synthetic resin the molecules of which are oriented substantially in the longitudinal direction of the glass fibre, in which a low application temperature, a low pressure and a high cladding rate can be used in that the oriented synthetic resin is formed from a curable synthetic resin composition which comprises one or more oligomeric compounds the molecules of which comprise reactive groups and the molecular weight of which is smaller than 5000.

The invention further relates to a method of manufacturing such an optical fibre and a device for cladding a glass fibre with a curable synthetic resin composition in which an elongation flow in the curable synthetic resin composition is produced to effect the orientation in the curable synthetic resin composition.

6 Claims, 4 Drawing Figures a b

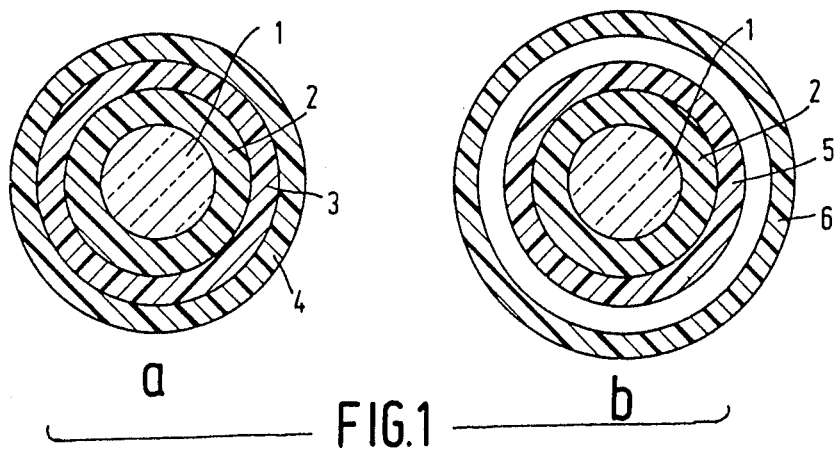
a  FIG.1  b
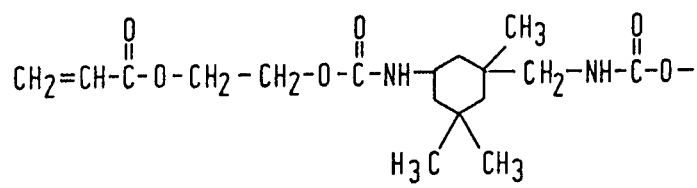
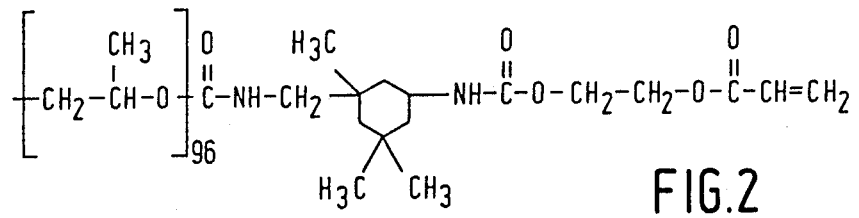
FIG.2
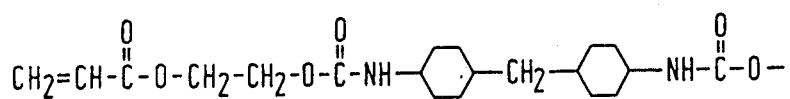
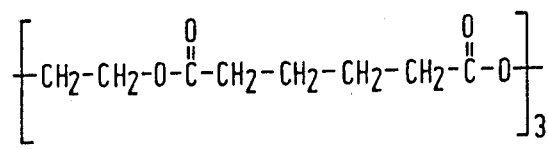
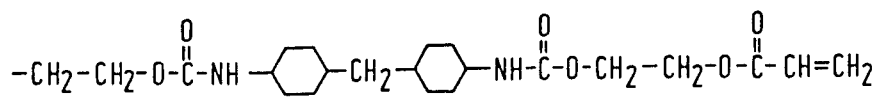
FIG.3

OPTICAL FIBRE COMPRISING A SYNTHETIC RESIN CLADDING AND METHOD OF AND DEVICE FOR MANUFACTURING SUCH AN OPTICAL FIBRE

The invention relates to an optical fibre having a synthetic resin cladding, comprising a glass fibre, a first cladding layer of a synthetic rubber and a subsequent cladding layer of a synthetic resin the molecules of which are oriented mainly in the longitudinal direction of the glass fibre.

The invention also relates to a method of and a device for manufacturing such an optical fibre.

Glass fibres for optical telecommunication generally have a cladding of a synthetic resin so as to prevent mechanical damage. In order to prevent optical transmission losses as a result of microbends, a cladding is preferred which is built up from various layers. For example, the following method is used. Right after the formation of the glass fibre, for example, by drawing from a preform or by means of the double-crucible method, a first soft buffer layer is applied consisting of a synthetic rubber having a modulus of elasticity from 1 to 10 MPa. In order to protect this soft buffer layer during the further processing of the optical fibre, a second harder top layer is provided of a synthetic resin having a modulus of elasticity exceeding 100 MPa. This top layer is also applied directly after the formation of the glass fibre, that is to say before the fibre is guided over a pulley or is stored. The buffer layer and the top layer together constitute the primary synthetic resin cladding of the glass fibre.

In order to protect the optical fibre from ambient influences during the cabling, during laying the cables and during the life of the cables, the optical fibre is additionally provided with a thicker secondary synthetic resin cladding having a modulus of elasticity exceeding 1 GPa. This secondary synthetic resin cladding is not necessarily applied directly after the formation of the glass fibre.

Two forms of such a secondary synthetic resin cladding are used. In one form the optical fibre with the primary synthetic resin cladding is positioned freely in the secondary synthetic resin cladding which thus forms a tube. The space between the optical fibre and the tube is generally filled with a thixotropic liquid or gel, for example, a silica-filled silicon oil. In the other form the secondary synthetic resin cladding is bonded in an adhering manner with the primary synthetic resin cladding.

It is known that the microbend losses of an optical fibre under transverse load can be made small without resulting in a great temperature sensitivity, by giving the molecules of a part of the synthetic resin cladding a preferred orientation in the longitudinal direction of the optical fibre. As a result of this, the modulus of elasticity of the synthetic resin in the longitudinal direction is increased whereas the coefficient of thermal expansion becomes smaller. The coefficient of thermal expansion of the glass fibre preferably is substantially equal to that of the synthetic resin.

In a publication by Y. Shuto et al in Electronics Letters, Vol. 20, pp. 841-842 (1984) the manufacture is described of such an optical fibre in which a glass fibre is clad with a buffer layer of a silicon rubber. A liquid crystalline polyester cladding is then applied to the fibre by extrusion at a temperature above 240° C., an orientation of the polyester molecules being obtained by shearing during the extrusion. The orientation is fixed by cooling the molten polyester, the latter solidifying.

However, this known method shows a number of disadvantages. As a result of the high temperature during the extrusion process the choice of suitable materials for the buffer layer is restricted. For example, in polyurethane rubbers thermal degradation may occur during extrusion of a subsequent layer. Moreover, as a result of the high temperature a long cooling track is necessary before the fibre can be further processed or be reeled. When cooling by running water a cooling trough is necessary having a length of over 5 meters for layer thicknesses and fibre coating rates which are conventional in the art. This is a disadvantage in particular when it is desired to provide the secondary cladding right after drawing the glass fibre. Another disadvantage is constituted by the high viscosity (more than 100 Pa.s) of the molten synthetic resin. The fibre coating rate is restricted by the highest pressure which can be applied during extrusion to transport the synthetic resin. In particular when a thin cladding is applied through a narrow nozzle, the pressure is a restricting factor.

It is the object of the invention to provide an optical fibre and a method of manufacturing thereof as described in the opening paragraph in which the above-mentioned disadvantages are avoided.

SUMMARY OF THE INVENTION

According to the invention this object is achieved by an optical fibre as described in the opening paragraph which is characterized in that the oriented synthetic resin is formed from a curable synthetic resin composition which comprises one or more oligomeric compounds the molecules of which comprise reactive groups and the molecular weight of which is smaller than 5000.

Although it is known to clad glass fibres for telecommunication purposes right after the formation of the glass fibre with a curable synthetic resin composition and then curing same, notably for the manufacture of the primary synthetic resin cladding, see, for example, Netherlands patent application NL No. 8401981, a layer of a synthetic resin is formed in such cases which does not show a particular orientation in the longitudinal direction of the glass fibre.

Within the scope of the invention various choices are possible for the position of the cladding layer of oriented synthetic resin. The oriented synthetic resin layer may be, for example, the top layer of the primary synthetic resin cladding or a tightly fitting secondary synthetic cladding. It is also possible to manufacture both the top layer of the primary synthetic resin cladding and the secondary synthetic resin cladding from an oriented synthetic resin.

As a result of the orientation of the polymer molecules in the cladding layer a high modulus of elasticity and a low coefficient of expansion of the synthetic resin in the longitudinal direction of the optical fibre are obtained. As a result of the low viscosity of the curable synthetic resin composition only a low pressure is necessary for extrusion as a result of which a high coating rate can be achieved and thin layers can also be provided. The application and curing of the synthetic resin composition may take place at a low temperature, for example lower than 100° C., as a result of which the buffer layer of the primary synthetic resin cladding is not attacked. Applying and curing the synthetic resin composition can now be done without a trough of cooling water and can now be carried out at such a high rate that the cladding of the glass fibre can be carried out in one process step including the secondary synthetic resin coating if this is formed from the curable synthetic resin composition.

A particular advantage of the optical fibre and method according to the invention is that the top layer of the primary synthetic resin cladding is no longer necessary and may hence be omitted if the secondary synthetic resin cladding is provided right after the formation of the fibre in the form of an oriented synthetic resin layer.

As a result of the anisotropic properties of the oriented synthetic resin, water absorption in the synthetic resin cladding results mainly in an increase in volume in the directions transverse to the glass fibre. As a result of this the optical fibre is less sensitive to optical damping as a result of water absorption than an optical fibre having an isotropic synthetic resin cladding.

The curable synthetic resin composition which is used according to the invention must comprise reactive oligomeric molecules having a regular structure as a result of which properties like those of a liquid crystalline material are obtained. The molecular weight of the oligomeric compound must be smaller than 5000 to give the molecules sufficient mobility for orientation.

BRIEF DESCRIPTION OF THE DRAWING

In an optical fibre according to the invention the oligomeric compound is selected from the group formed by polyester urethane acrylates and polyether urethane acrylates. These compounds have such a regular structure that in the non-cured condition they are crystalline at room temperature. The curable synthetic resin composition may further comprise reactive monomers and other conventional additives as they are described, in Netherlands patent application NL No. 8401981/11068.

According to the invention, the object of providing a method of manufacturing an optical fibre is fulfilled by means of a method in which a curable synthetic resin composition which comprises one or more oligomeric compounds, the molecules of which comprise reactive groups and the molecular weight of which is smaller than 5000, is provided on a glass fibre having at least one enveloping layer of a synthetic rubber, in which the molecules of the curable synthetic resin composition are oriented during the application of the layer to the glass fibre after which the curable synthetic resin composition is cured to form a synthetic resin the molecules of which are mainly oriented in the longitudinal direction of the optical fibre.

Figure 4:
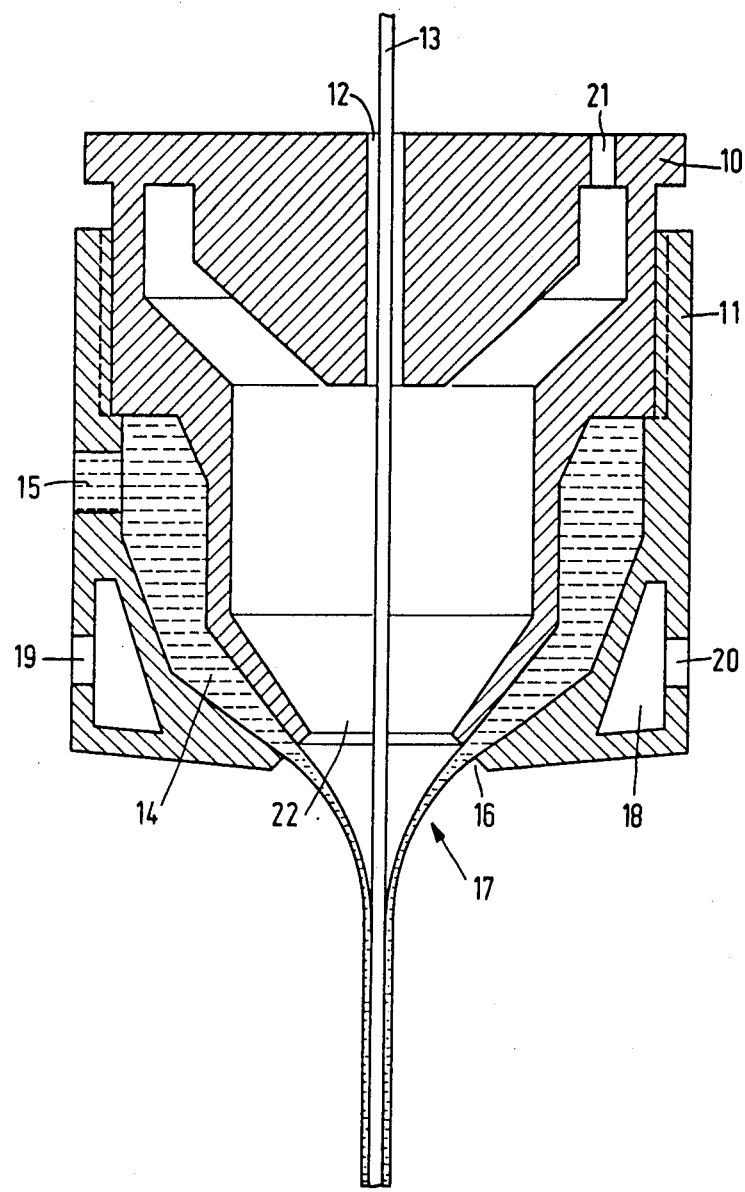

The molecules of the oligomeric compound may be oriented during or after coating the glass fibre, for example, by means of shearing forces in the liquid. A particularly effective orientation is achieved according to the invention in that the molecules of the curable synthetic resin composition are oriented during the application to the glass fibre by means of an elongation flow. The elongation in the liquid is determined by the fibre-drawing rate and the outflow rate of the curable synthetic resin composition which can be controlled, for example, by means of the pressure.

In order to prevent inclusion of air in the synthetic resin cladding, it is preferred to use a subatmospheric pressure in the space between the glass fibre and the applied curable synthetic resin composition.

In order to fix the orientation of the molecules in the curable synthetic resin composition by means of a cross-linking reaction, the curable synthetic resin composition must be cured in a period of time which is shorter than the relaxation time of the molecules. The relaxation time of the molecules is determined by the molecule size and the attractive force between the molecules. Good results can be obtained with the above-described oligomeric compounds and with reactive low molecular liquid crystalline compounds.

Curing the curable synthetic resin composition may take place, for example, by raising the temperature in which case, however, the relaxation time of the oriented molecules becomes shorter.

In a preferred embodiment of the method in accordance with the invention the curable synthetic resin composition is made to cure by means of actinic radiation. Actinic radiation is to be understood to mean, for example, radiation with UV light, electrons, X-rays, gamma rays or high energetic particles. Upon exposure to UV light, curing times shorter than 0.1 sec. have been obtained. Particularly short curing times can be obtained by curing in a nitrogen atmosphere. It is efficacious to place the irradiation device at the shortest possible distance from the fibre cladding device to restrict loss of orientation of the oriented molecules. A known advantage of the use of a radiation-curable synthetic resin composition is the absence of solvents and other substances which have to be removed from the formed layer during or as a result of the curing. In the method according to the invention this also favours the curing rate and the maintenance of the orientation of the molecules in addition to protecting the surroundings.

A further object of the invention is to provide a device for cladding a glass fibre with a curable synthetic resin composition, which device is suitable to provide an orientation to the molecules in the curable synthetic resin composition during the coating of the glass fibre.

According to the invention, this object is achieved by means of a device which comprises an annular nozzle, the diameter of the annulus being chosen to be larger than the diameter of the glass fibre with layer applied. In a conventional fibre cladding device the glass fibre to be cladded is drawn through a liquid in a vessel having a narrow opening for passing the glass fibre.

The invention will now be described in greater detail with reference to embodiments and a comparative example and with reference to the drawings.

FIGS. 1a and 1b are sectional views (not drawn to scale) of two embodiments of an optical fibers of the invention, FIG. 2 is the structural formula of a polyetherurethane acrylate, FIG. 3 is a structural view of a polyesterurethane acrylate, and FIG. 4 is a sectional view of a device for manufacturing.

Examples of the optical fibre and method according to the invention

A glass fibre is formed in known manner by drawing from a preform. Glass fibre is to be understood to be a fibre of glass or quartz glass. The fibre comprises a core glass and a cladding glass having different refractive indices (not shown in the FIGS. 1a and 1b). Alternatively, a fibre having a refractive index which varies from the centre to the outside may be used. Instead of a fibre drawn from a preform, a fibre manufactured by means of the double-crucible method may be used. The glass fibre 1 shown in FIGS. 1a and 1b has a circular cross-section (diameter 125/μm), but the cross-section may alternatively have any other shape, for example, it may be elliptical.

Right after the formation of the glass fibre 1 a layer of a curable synthetic resin composition is provided thereon which is then cured to form a buffer layer 2 of a synthetic rubber having a thickness of 30/μm. The curable synthetic resin composition comprises as the main constituent (76% by weight) a polyetherurethane acrylate as described in Netherlands patent application NL No. 8401981 and shown in FIG. 2. The curable synthetic resin composition further comprises the reactive monomers 2-phenoxy-ethylacrylate (14% by weight) and hexanedioldi-acrylate (2% by weight), and the photosensitive initiators 2,2-dimethoxy-2-phenyl-acetophenone (2% by weight), 2,2-dimethyl-2-hydroxy-acetophenone (2% by weight) and 2-oxy-benzophenone-2-ethoxy-ethylacetophenone (2% by weight). The curable synthetic resin composition finally comprises 2% by weight of a mixture of mono- and di-2-acryloxyethyl-phosphate having a molecular ratio of 1:1. Other curable synthetic resin compositions, for example polysiloxanes, are also suitable for use for the buffer layer of the synthetic resin cladding of the glass fibre according to the invention. The curable synthetic resin composition is cured by radiation from a high pressure mercury lamp which produces UV light having wavelengths of 200 to 400 nm with an intensity of 0.27 W/cm$^2$ measured on the synthetic resin layer for at most 0.5 sec. It is also possible to cure the curable synthetic resin composition differently, for example, by exposure to electrons, in which case the curable synthetic resin composition need not comprise a photosensitive initiator.

A second layer, of a thickness of 30 μm synthetic resin 3 is then provided on the buffer layer 2 (see FIG. 1a) for example, by cladding the fibre with a curable synthetic resin composition which is then made to cure by exposure to UV light. A suitable commercially available synthetic resin composition for the second layer (top layer of the primary synthetic resin cladding) is DeSolite 042® of DeSoto Inc., which comprises a polyurethane acrylate and a photosensitive initiator.

An outer synthetic resin cladding 4 is then provided in a thickness of 300/μm. For this purpose a curable synthetic resin composition is used which comprises 98% by weight of a polyesterurethane acrylate as shown in FIG. 3 and which further comprises 2% by weight of the photosensitive initiator 1-hydroxy-1-methylethylphenylketone. This synthetic resin composition is applied to the glass fibre with the primary synthetic resin cladding at a temperature of 80° C. The viscosity of the synthetic resin composition at 80° C. is 6.7 Pa.s. During the application the curable synthetic resin composition is subjected to an elongation flow as a result of which the molecules are oriented. The orientation which is obtained in this manner is fixed by the cross-linking reaction during curing. The curable synthetic resin composition is cured by exposure to an electrodeless mercury lamp of Fusion Systems Inc. with an intensity of 0.27 W/cm$^2$ measured on the synthetic resin composition. By curing in a nitrogen atmosphere and as a result of the temperature of 80° C. the curing time is less than 0.03 sec.

The orientation in the resulting synthetic resin cladding 4 can be made visible by means of a polarization microscope. A few measured properties of the anisotropic material are recorded in Table 1.

TABLE 1:

| | temperature | | |
|---|---|---|---|
| | −40° C. | 25° C. | 80° C. |
| Coefficient of expansion | | | |
| axial ($10^{-5}$/°C.) | 1.1 | 2.6 | 2.7 |
| radial ($10^{-5}$/°C.) | 7.0 | 8.0 | 26.0 |
| Modulus of elasticity | | | |
| axial (MPa) | 34200 | 14600 | 300 |
| radial (MPa) | — | 600 | — |
| Fracture strength | | | |
| axial (MPa) | — | >60 | — |

The anisotropic material is characterized by a low axial coefficient of expansion (linear coefficient of thermal expansion) and a high axial modulus of elasticity and fracture strength. The material shows oriented crystallisation. In this example the melting temperature of the crystals is 70° C., which explains the low modulus of elasticity at 80° C. According to the invention it is possible to use a material having a higher melting temperature of the crystals.

In an alternative embodiment of the optical fibre according to the invention (FIG. 1b) a top layer 5 of synthetic resin cladding is manufactured and applied in the same manner as cladding 4 of (FIG. 1b ) and for example, at a thickness of 40/μm. For further protection the optical fibre may be enveloped in a tube 6 of a thermoplastic synthetic resin, for example nylon, in which the fibre can move freely. As result of this a particularly temperature-insensitive fibre is obtained.

COMPARATIVE EXAMPLE, NOT ACCORDING TO THE INVENTION

In the manner described in the previous examples a glass fibre with synthetic resin cladding is manufactured in which, however, the curable synthetic resin composition for the formation of the layer 4 (FIG. 1a) or 5 (FIG. 1b) is not subjected to an elongation flow during the application. The curable synthetic resin composition is provided in the conventional manner by drawing the glass fibre through a vessel comprising the curable synthetic resin composition. The properties of the isotropic material obtained after curing are recorded in Table 2.

TABLE 2

| Not according to the invention. | | | |
|---|---|---|---|
| | temperature | | |
| | −40° C. | 25° C. | 80° C. |
| Coefficient of expansion ($10^{-5}$/°C.) | 7.0 | 13.0 | 18.0 |
| Modulus of elasticity (MPa) | 1800 | 600 | 18 |
| Fracture strength (MPa) | — | 28 | — |

A comparison with Table 1 shows that the properties of the isotropic material are comparable with the properties of the anisotropic material in the radial direction but are significantly less suitable than the properties of the anisotropic material in the axial direction. Exactly these latter material properties are of importance when used as a cladding material for optical fibres.

EXAMPLE OF THE DEVICE ACCORDING TO THE INVENTION

FIG. 4 is a diagrammatic sectional view through a fibre cladding device comprising an upper part 10 and a lower part 11, which parts are secured together, for example, by means of a screw connection. The upper part 10 comprises a supply duct 12 through which a glass fibre 13 with the cladding layers optionally present already (not shown in the Figure) can be passed. The upper part 10 and the lower part 11 enclose a space 14. The curable synthetic resin composition can be applied through an inlet aperture 15 in the lower part 11 and applied to the glass fibre 13 via the space 14 and an annular nozzle 16. The diameter of the annular nozzle 16 exceeds the diameter of the glass fibre 13 with all its layers. The transport rate of the glass fibre 13 in the downward direction is chosen to be large so that the liquid curable synthetic resin composition is subjected to an elongation flow at the area which is denoted by the arrow 17 in the Figure. In the lower part 11 ducts 18 with an inlet aperture 19 and an outlet aperture 20 are present through which during operation a heating liquid, for example water, can be passed at a temperature of 80° C. In the upper part 10 an aperture 21 is present which can be connected to a vacuum pump (not shown in the Figure) to produce a sub-atmospheric pressure in the space 22 between the glass fibre 13 and the applied synthetic resin composition.

What is claimed is:

1. An optical fibre having a synthetic resin cladding, comprising a glass fibre, a first cladding layer of a synthetic rubber and a subsequent cladding layer of a synthetic resin the molecules of which are oriented mainly in the longitudinal direction of the glass fibre, characterized in that the oriented synthetic resin is formed from a curable synthetic resin composition which comprises one or more oligomeric compounds the molecules of which comprise reactive groups and the molecular weight of which is smaller than 5000.

2. An optical fibre as claimed in claim 1, characterized in that the oligomeric compound is selected from the group formed by polyesterurethane acrylates and polyetherurethane acrylates.

3. A method of manufacturing an optical fibre, characterized in that a curable synthetic resin composition which comprises one or more oligomeric compounds the molecules of which comprise reactive groups and the molecular weight of which is smaller than 5000, is applied to a glass fibre having at least one enveloping layer of synthetic rubber, in which the molecules of the curable synthetic resin composition are oriented during application to the glass fibre, after which the curable synthetic resin composition is made to cure while forming a synthetic resin the molecules of which are oriented substantially in the longitudinal direction of the optical fibre.

4. A method as claimed in claim 3, characterized in that the molecules of the curable synthetic resin composition are oriented during the application to the glass fibre by means of an elongation flow.

5. A method as claimed in claim 4, characterized in that a sub-atmospheric pressure is applied in the space between the glass fibre and the applied curable synthetic resin composition.

6. A method as claimed in claim 3, characterized in that the curable synthetic resin composition is made to cure by means of actinic radiation.

* * * * *